United States Patent [19]

Heidecker

[11] Patent Number: 4,512,096
[45] Date of Patent: Apr. 23, 1985

[54] ANIMAL IDENTIFICATION BAND AND METHOD AND MEANS FOR PERMANENTLY FASTENING SAME

[75] Inventor: Robert F. Heidecker, Bozeman, Mont.

[73] Assignee: Dairy Systems, Inc., Longmont, Colo.

[21] Appl. No.: 312,857

[22] Filed: Oct. 19, 1981

[51] Int. Cl.³ .............................................. G09F 3/00
[52] U.S. Cl. .................................... 40/304; 40/21 R; 40/625; 219/544; 119/51 R
[58] Field of Search ............... 40/21 C, 21 R, 625, 40/304; 119/51 R; 219/544; 428/347; 156/291, 292

[56] References Cited

U.S. PATENT DOCUMENTS

| | | | |
|---|---|---|---|
| 2,384,676 | 9/1945 | Hill | 156/291 |
| 3,027,665 | 4/1962 | St. John | 40/21 |
| 3,059,359 | 10/1962 | Goldammer et al. | 40/21 |
| 3,336,530 | 8/1967 | Sloan et al. | 325/29 |
| 3,399,478 | 9/1968 | Tarver | 40/300 |
| 3,898,886 | 8/1975 | Hamm | 73/432 |
| 3,952,438 | 4/1976 | Propst et al. | 40/300 |
| 4,054,703 | 10/1977 | Boehm | 428/347 |
| 4,055,839 | 10/1977 | Skeggs | 340/279 |
| 4,078,324 | 3/1978 | Wiebe | 40/21 C |
| 4,093,277 | 6/1978 | Nolan et al. | 40/21 C |
| 4,129,855 | 12/1978 | Rodrian | 340/152 T |
| 4,176,274 | 11/1979 | Lippera | 219/544 |
| 4,224,505 | 9/1980 | Sturm | 219/544 |
| 4,247,758 | 1/1981 | Rodrian | 235/93 MS |
| 4,289,552 | 9/1981 | Hammer | 156/73.4 |
| 4,314,870 | 2/1982 | Ishida et al. | 156/291 |

FOREIGN PATENT DOCUMENTS 2800082  7/1978  Fed. Rep. of Germany.

OTHER PUBLICATIONS

Dillon, B. C., "Electronic Identification Method", *IBM Technical Disclosure Bulletin;* vol. 20, No. 11B; Apr. 1978; pp. 4679–4680.

*Primary Examiner*—Gene Mancene
*Assistant Examiner*—Wenceslao J. Contreras
*Attorney, Agent, or Firm*—John E. Reilly

[57] ABSTRACT

An identification device wherein a flexible elongated strap is adapted for disposition into encircling relation about an extremity of an animal, such as, the legs or neck, comprising at least opposite ends of the strap composed of a heat-fusible, inelastic material. Opposite ends of the strap are temporarily secured as a preliminary to permanent fastening, and temporary securing means in the form of complementary fastening members at opposite ends of the strap operate to secure opposite ends in overlapping relation to one another. A partially embedded heating element in one end of the strap projects in contacting relation with the other end and has a melting point above that of the material of the opposite ends so that when current is applied thereto sufficient to melt the strap, it will simultaneously fuse opposite ends of the strap together.

10 Claims, 7 Drawing Figures

U.S. Patent    Apr. 23, 1985    4,512,096
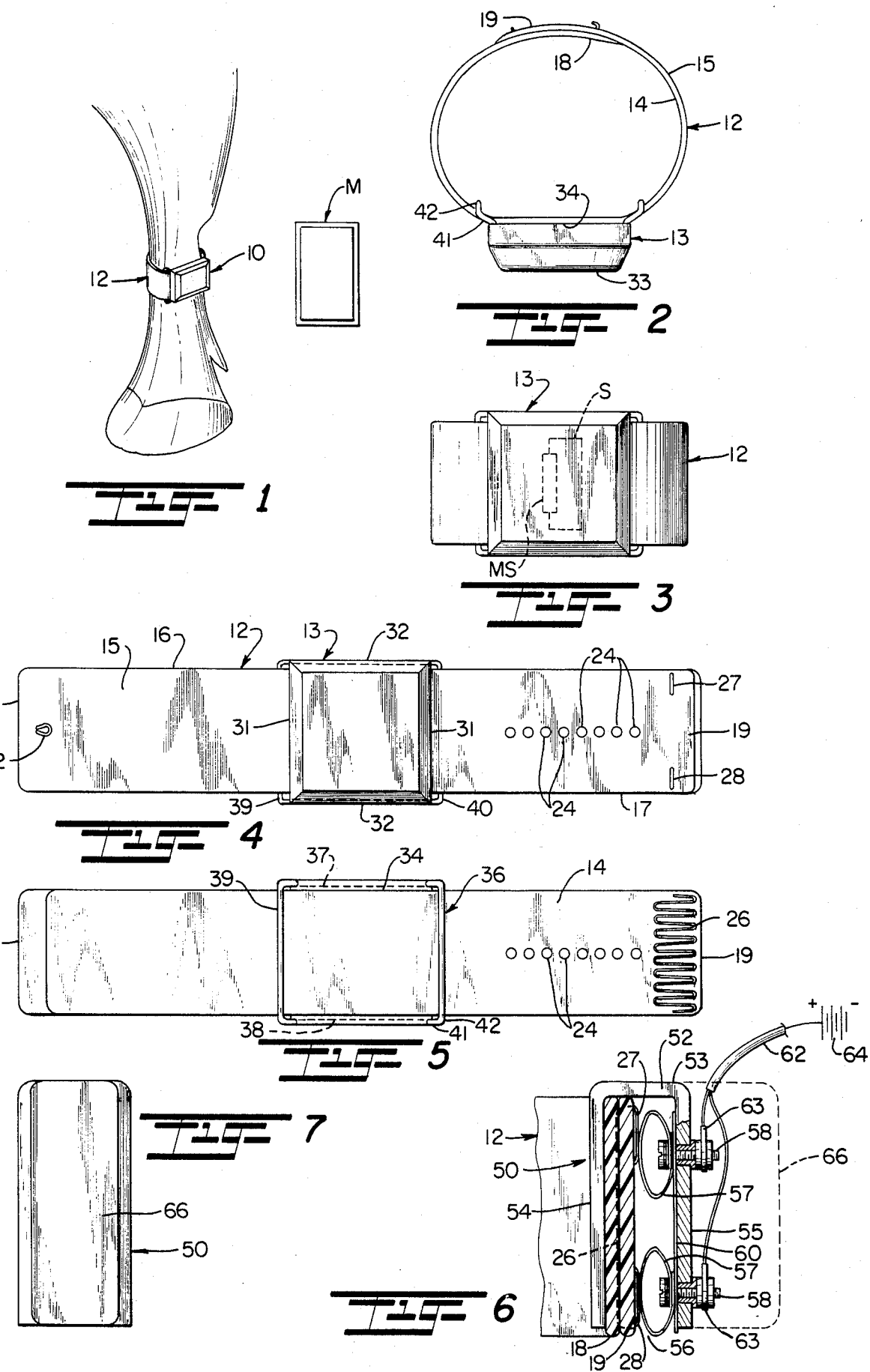

ANIMAL IDENTIFICATION BAND AND METHOD AND MEANS FOR PERMANENTLY FASTENING SAME

This invention relates to animal identification devices as well as the securing of such devices to an animal, and more particularly relates to an animal leg band capable of supporting a transponder together with a novel and improved means for securing the band and transponder in place to the leg of an animal.

BACKGROUND AND FIELD OF THE INVENTION

There has been an increasing awareness in recent years of the value of identification and monitoring of dairy cattle, such as, for instance, to determine a cow's health and condition, estrus detection, amount of nourishment required and ability to yield milk. In larger herds, such systems for identification and activity monitoring virtually necessitate some automatic means of identification and recording of data for each cow. Sophisticated sensing systems have been devised which are capable of accomplishing the foregoing and where both identification and transmission of data may be done remotely and automatically. Representative approaches are disclosed in U.S. Pat. Nos. to Rodrian 4,129,855 and 4,247,758 in which the cow is equipped with a transponder including a motion sensor so that when the animal is within the range of a transceiver, the transponder is activated to transmit data for identification of the animal and its number of movements over a given time period. Such information either may be recorded or displayed, or a combination of both, through a suitable microprocessor or other type of data processing system.

The foregoing and other identification/monitoring systems have highlighted the need for an effective and dependable method and means of fastening the transponder unit or other identification means to the dairy cow so that it can be rapidly but securely attached to the cow in the field. In the past, various types of belt or loop fasteners have been devised and employed to encircle a portion of the animal, such as, its leg or neck. Typical of such approaches is that employed in U.S. Pat. No. 3,898,886 to Hamm which discloses a Velcro attachment for a legmounted distance measuring band. IBM Technical Disclosure Bulletin Volume 20, No. 11D dated April, 1978 is directed to a band or strap which can be permanently attached to an animal by puncturing the skin or ear to secure the strap in place.

U.S. Pat. No. 4,055,839 to Skeggs discloses a belt-type fastener specifically designed to be releasably attached around the belly portion of an animal. U.S. Pat. No. 3,336,530 to Sloan et al discloses a collar which similarly employs a belt-type fastener while U.S. Pat. No. 3,059,359 to Goldammer et al is directed more to a spring-type fastener in which a stud secured to one end of a bracelet is insertable through one of a series of openings at the opposite end of the bracelet and held in place by a foldable tab. Other representative U.S. Pat. Nos. are: 3,027,665 to St. John, C. and 3,898,886 to Hamm, A. B.

Further, it has been proposed to employ identification devices on a flexible plastic band which is intended to be wrapped around the article to be marked. One such approach is disclosed in German Pat. No. 2,800,082 and which is intended for use primarily as a means of identification of persons in a hospital.

SUMMARY OF THE INVENTION

It is therefore an object of the present invention to provide for a novel and improved fastener specifically adaptable for use in identification of animals.

Another object of the present invention is to provide for a novel and improved strap-type fastener which can be permanently secured to a portion of an animal or person, and wherein the fastener is capable of being adjusted to the desired length or size and fastened in encircling relation to a portion of an animal, such as, the leg or neck of an animal.

A further object of the present invention is to provide for a novel and improved method and means for mounting transponder circuitry on a portion of an animal which is rugged, but economical to manufacture and which can be rapidly, securely attached to an animal's leg in the field in such a way as to avoid damage to the transponder circuitry or injury to the animal.

A still further object of the present invention is to provide for a novel and improved method and means for securing a strap-type fastener to a portion of an animal together with a novel and improved means for mounting of suitable identification and other sensing circuitry to the animal.

It is an additional object of the present invention to provide for a novel and improved plastic band and transponder unit releasably attached to the band wherein the band may be adjustably but permanently fastened to an animal's leg in a rapid and dependable manner.

In accordance with the present invention, an identification device has been devised in which a flexible elongated strap is adapted for disposition into encircling relation about an extremity of an animal, such as, the legs or neck, at least opposite ends of the strap being composed of a heat-fusible but inelastic material. In order to secure opposite ends of the strap together as a preliminary to fastening, temporary securing means in the form of complementary fastening members at opposite ends of the strap operate to secure opposite ends in overlapping relation to one another. A heating element is partially embedded in one end of said strap to project from a surface thereof into contact with the other end when the opposite ends are disposed in overlapping relation to one another, the heating means or element having a melting point above that of the material of the opposite ends so that when heat is applied thereto it will simultaneously fuse opposite ends of the strap together. Preferred materials to be utilized in conjunction with the identification device of the present invention are to form the strap of a thermoplastic material and the heating element is formed of a wire-like resistance or fusing element which can be embedded into the surface of the strap at one end. The temporary securing means may for example consist of a projecting element at one end of the strap and a series of apertures or openings at the other end so that the effective size or circumference of the strap may be determined by selectively inserting the projection into one of the apertures as a preliminary to heating or fusing of the opposite ends together.

In combination with the identification device as described, a portable welder takes the form of a generally U-shaped mounting bracket provided with spaced-apart sidewalls which are of a length at least as great as the width of the strap and with the space or gap between sidewalls being greater than twice the thickness of the strap so that the overlapping ends of the strap may be inserted into the U-shaped mounting bracket. Contact elements along one interior sidewall of the mounting bracket will engage the heating element of the identification device when the overlapping ends are inserted in place and through application of power, for example, from a battery power source, the overlapping ends are quickly fused together.

Various means of identification may be placed on the identification device or band as described, such as, for instance a magnetic marker or similar member imprinted or otherwise embedded into the thickness of the strap. In the preferred form of invention, however, a sensing circuit is housed within a compact pod or casing, and support means on the casing are adapted to position the circuit on the external surface of the strap when mounted on the extremity of the animal. The support means is preferably defined by rigid wire loops projecting from opposite sides of the casing which are sized to permit insertion of the strap through the loop so that when the opposite ends of the strap are secured together, the pod is securely fastened to the leg of the animal. The loops may form opposite sides of a common open frame which is embedded, such as, by molding into the wall of the casing, and the loop ends are inclined along a gradual curvature rearwardly with respect to the body of the pod so as to be fit on the leg of the animal without rubbing or scraping against the leg when mounted thereon.

The above and other objects, advantages and features of the present invention will become more readily appreciated and understood from a consideration of the following detailed description of a preferred embodiment of the present invention when taken together with the accompanying drawings of a preferred embodiment of the present invention, in which:

Brief Description of the Drawings

FIG. 1 is a perspective view illustrating the mounting of a preferred form of identification band on the rear leg of an animal;

FIG. 2 is a top plan view of the preferred form of animal identification band as shown in FIG. 1;

FIG. 3 is a front view of the identification band illustrated in FIG. 2;

FIG. 4 is a front view in elevation of the band prior to its connection around the leg of an animal;

FIG. 5 is a rear view of the band as illustrated in FIG. 4;

FIG. 6 is a cross-sectional view of a preferred form of welding unit employed in heat-sealing opposite ends of the band together; and FIG. 7 is a front view in elevation of the welding unit illustrated in FIG. 6.

DETAILED DESCRIPTION OF THE PREFERRED EMBODIMENT

Referring in detail to the drawings, a preferred form of animal identification band is illustrated in FIGS. 1 to 7 and is generally designated at 10 which is broadly comprised of a flexible elongated strap 12 to which is secured a sensing circuit contained within a housing 13 for monitoring an animal's activity. As schematically shown in FIG. 3, the sensing circuit may include a control switch S employed in combination with a mercury switch MS and other associated circuitry to identify an animal and provide an indication or measurement of its activity over a given time period. For example, the control switch S may be comprised of a reed switch activated remotely by a magnetic field such as represented at M in FIG. 1 to activate the transponder circuitry to a transceiver, not shown, located in the vicinity of the magnetic field. While the specific form of sensing circuit forms no part of the present invention, its manner of mounting on the animal so as to be securely fastened to the animal at a location to be responsive to a remote signal, such as, from a magnetic field is an important feature of the present invention. Moreover, while the preferred form of animal identification band is hereinafter described with reference to its attachment to the rear leg of an animal, it will be readily appreciated that the band may be dimensioned to be of different lengths for attachment at other extremities, such as, to encircle the neck of an animal.

Considering in more detail the construction and arrangement of the preferred form of invention, the flexible elongated strap 12 is composed of a non-elastic but flexible material which is formed, such as, by molding into an oblong, generally rectangular configuration having opposite, relatively flat, inside and outside surfaces 14 and 15, respectively, upper and lower beveled edges 16 and 17, respectively, and generally squared, opposite ends 18 and 19, each of the ends 18 and 19 being tapered or beveled as illustrated in FIGS. 2, 4 and 5. One end 18 is provided on its outside surface 15 with a male projection in the form of a hook 22, and a portion of the strap adjacent to the opposite end 19 is provided with a series of longitudinally spaced apertures 24 dimensioned to permit insertion of the hook 22 when the strap is wrapped around the animal's leg as illustrated in FIGS. 1 and 2. The male projection 22 in combination with the apertures 24 is intended to form an adjustable, temporary securing means between opposite ends of the band as a preliminary to permanent fastening of the band at the desired location about the animal's leg.

It is desirable to facilitate permanent fastening of the band in the field in a rapid, safe and dependable manner and to this end, the end 19 is provided with a wire-like, metal heating element 26 which is embedded in the manufacture of the strap so as to traverse the width of the strap at one end with opposite ends 27 and 28 of the element protruding through the thickness of the strap and bent inwardly toward one another across the opposite outside surface 15 of the strap adjacent to its upper and lower edges 16 and 17. The wire-like element 26 extends in generally serpentine or zig-zag fashion across the width of the strap and as indicated is at least partially embedded into the thickness of the strap along its inside surface 14. Preferably, the element 26 is composed of a high melting point material, such as, Nichrome which essentially forms a resistance heating element capable of being rapidly heated into temperatures in excess of 300° F. when electrical current is applied thereto. In turn, the preferred composition of the strap is a low melting point material, such as, a medium density polyethylene which, for example, may have a melting point or fusion temperature in the range of 305° F. to 320° F. so that when heated the element 26 is capable of fusing the confronting end surfaces of the strap so as to thermally bond or heat-seal them together.

Preferably, the sensing circuit is mounted, such as, by podding in a generally rectangular casing 13 and which, for example, is composed of a rigid plastic epoxy material. The casing 13 is provided with opposite sides 31, upper and lower edges 32 and opposed flat surfaces 33 and 34. In order to support the casing 13 securely on the strap 12, a mounting bracket 36 is in the form of an open rectangular frame or endless wire loop having upper and lower horizontally extending portions 37 and 38 embedded or molded into the casing and opposite sides 39 and 40 projecting in opposite directions away from opposite sides 31 of the casing Preferably each opposing side 39 and 40 of the mounting bracket 36 is correspondingly in the form of a loop portion having inclined portions 41 extending rearwardly in a common direction away from the opposite sides 31 then further inclining as at 42 to extend normal to the length of the strap and form corresponding openings which are sized for lengthwise insertion of the strap therethrough. The slight divergency given to the loop ends of the mounting bracket 36 permits the strap to be securely fastened to the rear leg of an animal with the loop end portions 42 fitting into slight recesses on opposite sides of the lower leg so as to minimize any rubbing or chafing of the animal's leg.

In order to permit fastening of the leg band onto an animal in the field, a welding unit 50 has been devised to permit application of current to develop the elevated temperatures necessary to fuse or cure the opposite ends 18 and 19 of the strap 12 together without burning the hide or skin of the animal. To this end, the welding unit 50 illustrated in FIGS. 6 and 7 comprises a rigid holder 52 of inverted, generally U-shaped configuration having an upper closed end 53 and opposed sidewalls 54 and 55 which are disposed in closely-spaced parallel relation to one another to form a common entrance 56 therebetween. The sidewalls are dimensioned to be of a length corresponding to the width of the strap with the spacing between sidewalls being greater than twice the thickness of the strap so as to permit insertion of the strap ends between opposite sidewalls as illustrated in FIG. 6. A pair of generally oval-shaped contact elements 57 are disposed in vertically spaced relation along the inside of sidewall 55 and are attached in facing relation to the opposite sidewall 54 by suitable fasteners in the form of bolts 58 extending through the sidewalls and provided with a rubber insulation strip 60 along the inner surface of the sidewall 55. The fasteners serve to conduct electricity from a power cord 62 which is connected to ring terminals 63 and extends from a DC power source in the form of a battery pack 64, the projecting ends of the fasteners 58 and terminal 63 being encased within a hand grip 66. The spacing between heating contacts 57 is generally dictated by the spacing between the terminal ends 27 and 28 of the resistance wire so that when the opposite ends 18 and 19 of the strap are overlapped and temporarily secured together as described, they can be inserted into the holder as illustrated in FIG. 6 with the terminal ends 27 and 28 contacting the contacts 57 so as to be rapidly heated to the elevated temperature necessary to fuse the ends of the strap together. Moreover, the contacts 57 and 58 possess limited resiliency and by forming into generally loop-shaped or oval configuration are spring-loaded so as to yieldingly engage and contact the exposed ends 27 and 28 when inserted therein. Notwithstanding the extreme amount of heat generated at the heating element 26 by battery current through the contacts 57, the holder 52 is insulated both from the heat and current generated by means of the strip 60 along one sidewall and the overlapping ends of the strap 12 along the opposite sidewall 54. Accordingly, this permits the operator to comfortably grasp the handle of the welder unit and insert the overlapping ends between the sides of the holder, then to activate the welder unit to cure the ends of the strap together.

It will be evident from the foregoing that various materials may be employed in the construction of the strap which have the characteristics of flexibility, inelasticity, strength and durability so as to withstand constant jarring or movement while adequately supporting the sensing circuitry on the strap. Other thermoplastic materials are, for example, various polyvinyl chloride and polyethylene compositions. Similarly, other fusing means may be employed in place of the wire element 26 to raise the temperature of the material to the fusion point; or in certain cases the material itself may be directly heated without permanently embedding the heating element therein, although elimination of the wire fusing element has not proven to provide the same secure, uniform bond as achieved in the preferred form.

In addition, it will be apparent that other means of identification may be employed in place of the sensing circuit, such as, magnetic markers or other identification imprinted directly on the plastic strap material. Again, the band or strap may be dimensioned to encircle an animal's neck or even midriff portion for identification purposes only. It is advantageous, however, to permit securing of the sensing circuitry to the animal's leg in order to enable accurate counting of the number of steps taken over a given time interval for the purpose of estrus detection. Thus, with the transponder incorporated onto the leg band as described, when the reed switch is activated it will transmit a signal identifying the animal coupled with the count which will indicate the number of movements of the animal. This may be transmitted in a well-known manner to a receiver and computer which will process and store the data received from each leg band as the animal passes through the energizing section, such as, the magnetic field as described. In order to remove the leg band, it is necessary to cut through its thickness and therefore is not intended to be reusable. However, the pod may be removed from one leg band and secured to another leg band for attachment to another animal.

It is therefore to be understood from the foregoing that various other modifications and changes may be made in the construction and arrangement of parts comprising the present invention without departing from the spirit and scope thereof as defined by the appended claims.

I claim:
1. An identification device comprising in combination:
an elongated flexible strap, opposite ends of which are composed of a heat-fusible material;
identification circuit housing means releasably secured to strap, said housing means including a hollow casing in the form of a generally rectangular pod and support means in the form of wire loop members on either side of said casing for securing said casing to said strap in superimposed relation;
temporary securing means defined by complementary fastening members at said opposite ends of said strap operative to temporarily secure said opposite ends in overlapping relation to one another whereby to establish the effective circumference of said strap as a preliminary to permanent fastening of said opposite ends together; and fusing means disposed on one of said opposite ends between confronting surfaces of said opposite ends when said opposite ends are arranged in overlapping relation to one another, said fusing means comprising an electrical conductive element extending across the substantial width of said one end having a melting point above the fusion point of said material of which said opposite ends are composed, said fusing means responsive to the generation of heat above the melting point of said heat-fusible material to fuse said opposite ends into permanently bonded relation to one another.

2. An identification device according to claim 1, said strap being in the form of a relatively flat, flexible member.

3. An identification system according to claim 1, said strap being composed of a material selected from the group consisting of polyvinyl chloride and polyethylene.

4. An identification system according to claim 1, said support means being in the form of an endless rigid wire loop having opposite upper and lower ends disposed in opposite ends of said casing, and opposite sides of said loop projecting laterally and in opposite directions away from said opposite sides of said casing.

5. An identification system according to claim 4, said opposite sides of said loops being inclined in a common direction away from said opposite sides of said casing.

6. An identification system according to claim 1, said support means defined by generally loop-shaped elements projecting from opposite sides of said casing and inclining in a common direction away from said casing for insertion of said strap through said loop elements and along a flat surface portion of said casing.

7. An animal identification device comprising in combination:
   a bracelet defined by an elongated flexible strap including opposite ends composed of a heat-fusible plastic material;
   identification circuit housing means releasably secured to said strap, said housing means including a casing and support means for securing said casing to said strap, said casing being a generally rectangular pod, and said support means being an endless rigid wire loop having opposite upper and lower ends disposed in opposite ends of said casing and opposite sides of said loop projecting away from said opposite sides of said casing;
   a fusing element at least partially embedded in one of said opposite ends to project from one surface thereof into contact with the other of said opposite ends when said opposite ends are disposed in overlapping relation to one another, said fusing element having a melting point above the fusion point of said material of which said opposite ends are composed; and
   releasable heat-generating means releasably disposed in surrounding relation to said opposite ends for the application of heat to said fusing element whereby said opposite ends are fused into permanently bonded relation to one another.

8. In an animal identification device according to claim 7, said fusing element composed of a conductive element extending across the substantial width of one of said opposite ends with opposite ends of said element extending through the thickness of said strap and projecting externally therefrom.

9. In an animal identification device according to claim 7, said support means defined by generally loop-shaped elements projecting from opposite sides of said casing and inclining in a common direction away from said casing for insertion of said strap through said loop elements and along a flat surface portion of said casing.

10. An identification device comprising in combination:
   an elongated flexible strap, opposite ends of which are composed of a heat-fusible material;
   temporary securing means defined by complementary fastening members at said opposite ends of said strap operative to temporarily secure said opposite ends in overlapping relation to one another comprising a male projection on one of said opposite ends and a plurality of longitudinally spaced openings at the other of said opposite ends being sized for insertion of said projection therein, said male projection insertable into one of said apertures to establish the effective circumference of said strap as a preliminary to permanent fastening of said opposite ends together; and
   fusing means disposed on one of said opposite ends between confronting surfaces of said opposite ends when said opposite ends are arranged in overlapping relation to one another, said fusing means comprising an electrical conductive element extending across the substantial width of said one end having a melting point about the fusion point of said material of which said opposite ends are composed, said fusing means responsive to the generation of heat above the melting point of said heat-fusible material to fuse said opposite ends into permanently bonded relation to one another.

* * * * *

UNITED STATES PATENT AND TRADEMARK OFFICE
CERTIFICATE OF CORRECTION

PATENT NO. : 4,512,096
DATED : April 23, 1985
INVENTOR(S) : Robert F. Heidecker

It is certified that error appears in the above—identified patent and that said Letters Patent is hereby corrected as shown below:

Column 1, line 48, cancel "legmounted" and substitute -- leg-mounted --.

Column 6, line 57 (Claim 1), after "to" insert -- said --.

Column 8, line 45 (Claim 10), cancel "about" and substitute -- above --.

Signed and Sealed this

Twenty-seventh Day of August 1985

[SEAL]

Attest:

DONALD J. QUIGG

Attesting Officer

Acting Commissioner of Patents and Trademarks